United States Patent [19]

Colomb

[11] Patent Number: 5,757,880

[45] Date of Patent: May 26, 1998

[54] APPARATUS, ARTICLE OF MANUFACTURE, AND METHOD FOR CREATION OF AN UNCOMPRESSED IMAGE OF COMPRESSED MATTER

[76] Inventor: Denis Colomb, 2810 Turnberry Rd., St. Charles, Ill. 60174

[21] Appl. No.: 780,756

[22] Filed: Jan. 8, 1997

[51] Int. Cl.[6] .................................................. A61B 6/00
[52] U.S. Cl. ................................................ 378/37; 378/98
[58] Field of Search ........................... 378/37, 69, 98; 250/369, 370.09

[56] References Cited

U.S. PATENT DOCUMENTS

| | | | |
|---|---|---|---|
| 4,807,637 | 2/1989 | Bjorkholm | 128/664 |
| 4,907,156 | 3/1990 | Doi et al. | 382/130 |
| 5,172,695 | 12/1992 | Cann et al. | 128/653.1 |
| 5,212,637 | 5/1993 | Saxena | 600/407 |
| 5,263,074 | 11/1993 | Sakamoto | 378/99 |
| 5,343,390 | 8/1994 | Doi et al. | 382/132 |
| 5,365,429 | 11/1994 | Carman | 378/37 |
| 5,365,562 | 11/1994 | Toker | 378/37 |
| 5,452,367 | 9/1995 | Bick et al. | 382/128 |
| 5,526,394 | 6/1996 | Siczek et al. | 378/37 |
| 5,537,485 | 7/1996 | Nishikawa et al. | 382/130 |
| 5,579,360 | 11/1996 | Abdel-Mottaleb | 378/37 |

*Primary Examiner*—David P. Porta
*Assistant Examiner*—David Vernon Bruce
*Attorney, Agent, or Firm*—Jordan Powell

[57] ABSTRACT

An apparatus, article of manufacture and method of creating an image of uncompressed matter from compressed matter are disclosed, such as a method of creating an image of uncompressed human breast tissue from an x-ray image of breast tissue compressed in the mammography process. The method embodiment includes the steps of dividing the compressed matter into a plurality of volumetric cells; collecting intensity data from the compressed matter, for each volumetric cell of the plurality of volumetric cells, to form volumetric cell data; and utilizing a deformation state lens and the volumetric cell data, creating the image of uncompressed matter.

22 Claims, 2 Drawing Sheets

APPARATUS, ARTICLE OF MANUFACTURE, AND METHOD FOR CREATION OF AN UNCOMPRESSED IMAGE OF COMPRESSED MATTER

FIELD OF THE INVENTION

This invention relates in general to imaging processes and devices and, more specifically, to an apparatus, article of manufacture and method for creation of an uncompressed image of compressed matter, such as breast tissue compressed in the mammography process.

BACKGROUND OF THE INVENTION

Imaging of certain types of matter or tissue, such as human breast tissue, typically may be conducted when the matter or tissue is in a compressed state, such as x-ray imaging of human breast tissue in the mammography process. Such imaging of compressed tissue is preferred due to the decreased thickness achieved by compression, thereby decreasing the cross-sectional distance to be traversed by the x-ray or other imaging source. As a consequence of such decreased cross-sectional distance, the amount, dosage or strength of radiation (such as x-rays) necessary to provide a diagnostic image may also be decreased. A corresponding reduction in exposure to potentially harmful radiation, such as x-rays, is highly valuable, potentially decreasing health risks to the patients being examined.

In the prior art, however, this compression process has tended to diminish the imaging or visualization of certain anomalies and may also introduce artifacts or errors into the imaging process. For example, the compression involved in current mammography has tended to distort, decrease or even eliminate the ability to image or view potential small anomalies, such a microcalcifications, which are too small to palpate or feel, and which may represent possible lesions, lumps, cancerous masses, or pre-cancerous masses or cysts. As a consequence current mammography and other imaging processes are effectively unable to reliably detect such microcalcifications, correspondingly diminishing the diagnostic effectiveness of such current processes and procedures.

Accordingly, a need has remained for an apparatus, article of manufacture and method to provide an uncompressed image of compressed matter, such as providing an uncompressed image of human breast tissue compressed in the mammography process.

DETAILED DESCRIPTION OF THE INVENTION

As mentioned above, a need has remained for an apparatus, article of manufacture and method to provide an uncompressed image of compressed matter, such as providing an uncompressed image of human breast tissue which has been or is compressed in the mammography process.

The present invention provides for such an apparatus, article of manufacture, and method to provide an uncompressed image of such compressed matter. The apparatus, method and article of manufacture of the present invention also may be particularly useful for imaging and reliable detection of microcalcifications which may be present in human breast tissue.

As discussed in greater detail below, in accordance with the present invention, the compressed sample or tissue to be imaged is logically (not physically) divided into a plurality of volumetric cells, such as that which may be created from a grid or Cartesian pattern, such that subsequent calculations or processes are performed on an individual volumetric cell, its surrounding volumetric cells, or upon any other selected volumetric cells (regardless of adjacency). Intensity or other related data (such as texture data) from the compressed matter from, for example, an x-ray detector, is collected for each volumetric cell of the plurality of volumetric cells, to form volumetric cell data. Utilizing the volumetric cell data and a deformation state lens, discussed in greater detail below, an image of uncompressed matter is created.

Figure 1:
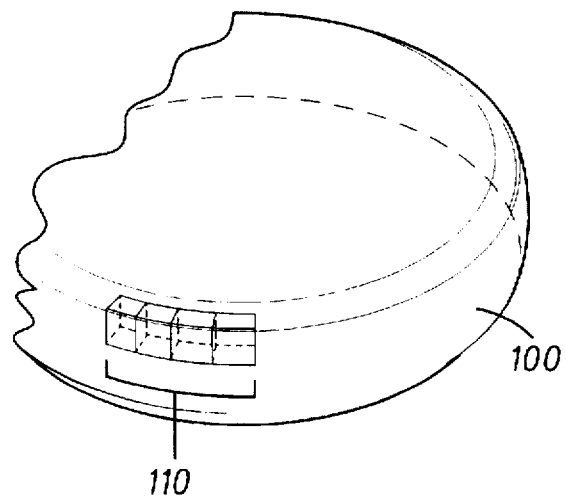
FIG. 1 is a diagram illustrating division of a sample into a plurality of volumetric cells in accordance with the present invention.

FIG. 1 is a diagram illustrating a logical division of a sample 100 into a plurality of volumetric cells 110 in accordance with the present invention. Effectively, the sample 100 (or any portion or section of the sample 100) may be logically divided into such a plurality of volumetric cells 110 and, in the preferred embodiment, each volumetric cell is cubic. For subsequent processing, the location of each such volumetric cell within the sample 110 may be identified utilizing any coordinate system, such as coordinates x, y and z of a Cartesian coordinate system. As the tissue is compressed, each such volumetric cell may be assigned a value representing the given parameter to be measured, such as x-ray intensity for breast tissue, or degree of deformation or stress for other types of materials.

A texture analysis is of particular importance for imaging of microcalcifications in human breast tissue. A value (or parameter) for texture assigned to each volumetric cell may be based upon empirical measurements of features such as roughness, reflectivity, and relationships of nearest neighbors (such as contrast). In particular for microcalcifications, bifurcations in the field or sample of tissue may be significant, and a maximum likelihood classifier may be utilized to distinguish such features in the compressed and subsequent uncompressed images. Texture analysis may also be based upon the location of the particular volumetric cell, such as (but not limited to) the location of a volumetric cell in relation to its nearest neighbors. For example, texture analysis may include whether the particular volumetric cell is located near a boundary or interface of interest, such as interfaces of skin, fat, and glandular tissue. As a consequence, values of potential interest, such as values indicating potential bifurcations where microcalcifications may have formed, may be assigned to each volumetric cell utilizing, for example, a maximum likelihood classifier and the relation of the particular volumetric cell to its nearest neighbors, such as whether the particular volumetric cell is located at a particular boundary or interface.

As mentioned above, in accordance with the present invention, utilizing the volumetric cell data collected, for example, in a mammography process, and using a deformation state lens, an image is created of a sample in its uncompressed state, based upon the volumetric data collected while the tissue was in a compressed state. The principles behind the inventive concept of the deformation state lens are, effectively, to view the sample (such as tissue) and/or each volumetric cell of the sample as a physical lens which is being transformed from a natural, uncompressed state to a compressed or deformed state. During such a compression or deformation process, there are corresponding changes in the properties of the lens, such as differences in scattering, absorption, or other imaging or optical properties. For purposes herein, the various lenses include: a natural state lens, defined as the lens in which the object is being imaged in its natural, uncompressed state; a deformation state lens, defined as the lens in which the object is being imaged in various degrees of compression, up to an including being fully compressed; and a relaxation state lens, defined as the lens in which the object is being imaged in various degrees of decompression, up to an including being fully decompressed.

Corresponding to these various lenses, and particularly useful for imaging microcalcifications, are textures (texture bodies or texture values). A natural state texture is defined by assembling a collection of naturally occurring roughness or scatter patterns which are representative of common or naturally occurring in normal, uncompressed image segments or volumetric cells. A deformation state texture is defined by assembling a collection of roughness or scatter patterns occurring in image segments or volumetric cells during the process of compression or deformation. For example, a deformation state texture for a tissue sample having microcalcifications may be an array of detected pixel values having a value of plus or minus one and one-half dB, where pixel values of plus or minus one-half dB would indicate smooth tissue. A relaxation state texture is defined by assembling a collection of roughness or scatter patterns occurring in image segments or volumetric cells during the process of decompression or reformation.

Figure 2:
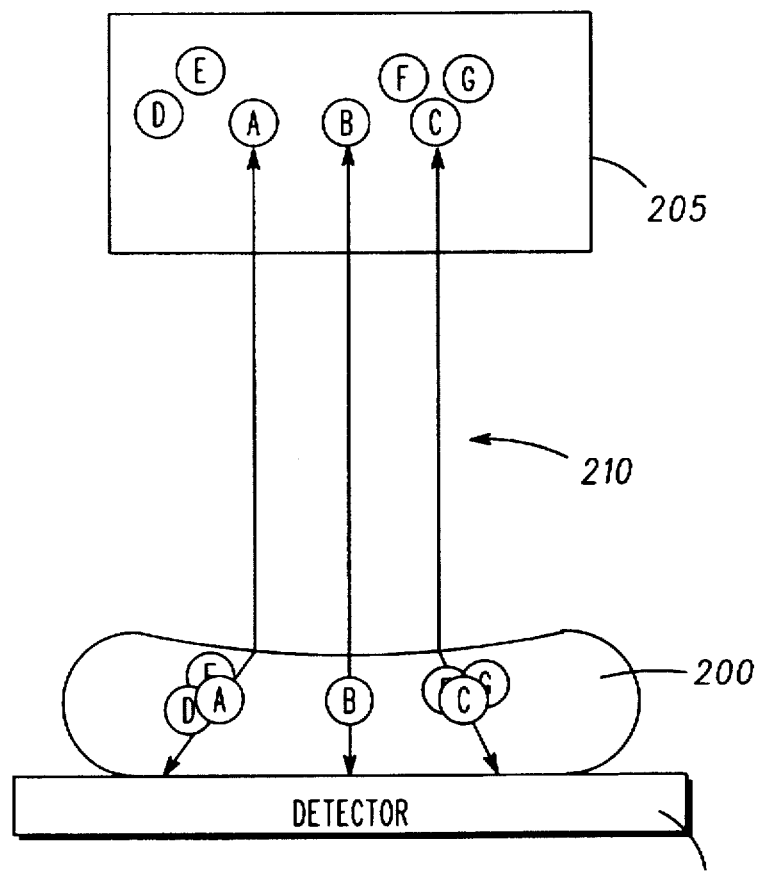
FIG. 2 is a diagram illustrating uncompressed state image formation from a compressed state utilizing a deformation state lens.
Figure 3:
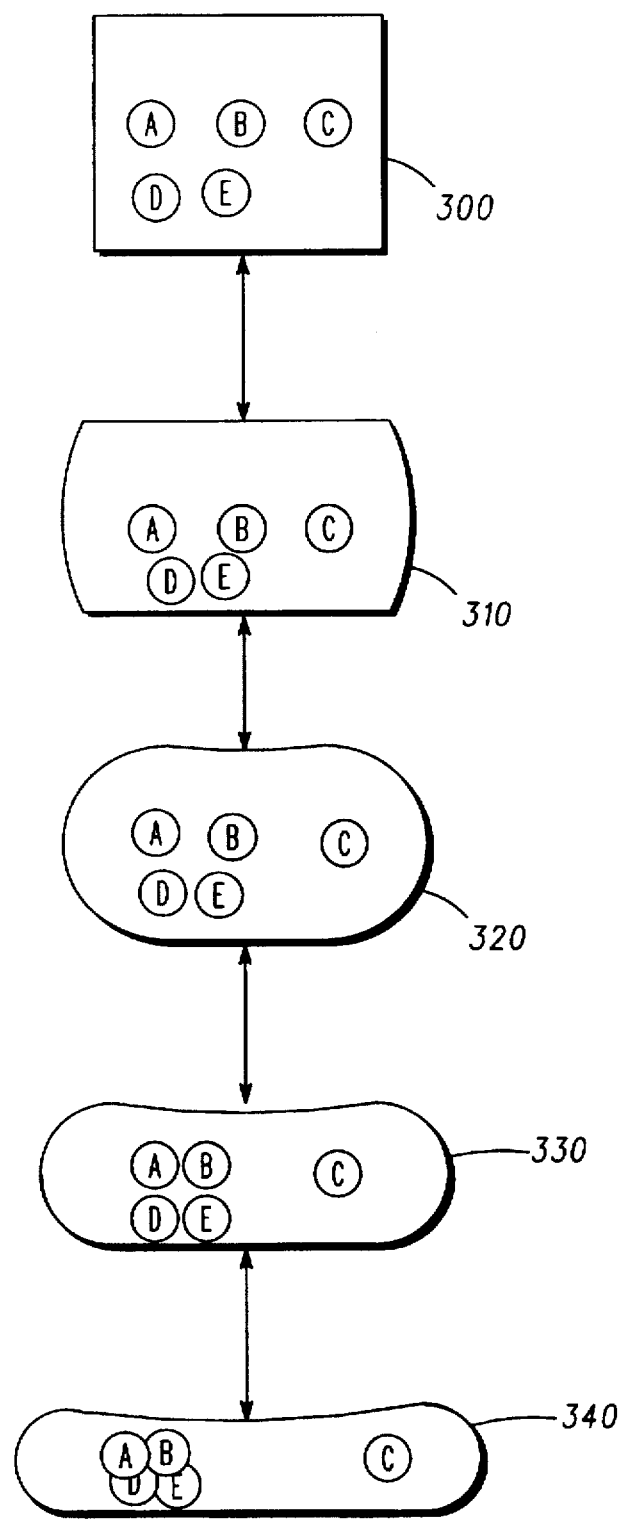
FIG. 3 is a diagram illustrating use of historical information of a deformation state lens for uncompressed state image formation from a compressed state.

FIG. 2 is a diagram illustrating uncompressed state image formation from a compressed state utilizing a deformation state lens 200. In FIG. 2, a detector 215 is utilized to collect volumetric cell data concerning the sample being imaged, such as an x-ray detector or radio frequency detector utilized in magnetic resonance imaging. The deformation state lens 200, as illustrated, may be a volumetric cell or a plurality of volumetric cells which are or have been compressed or deformed. Based upon the volumetric cell data collected by the detector 215, an image in an uncompressed state 205 of the sample is formed, based upon the properties of the given deformation state lens 200. As discussed in greater detail below, the properties of the deformation state lens may be derived based upon empirically determined optical properties or other empirical or historical information (FIG. 3). As illustrated in FIG. 2, optical properties of the deformation state lens are utilized to generate the image in an uncompressed state 205, as illustrated by the rays 210, such as x-rays or other signals, which are extrapolated or back projected from the detector 215 to form the image in an uncompressed state 205. Not illustrated in FIG. 2, such an uncompressed image would be formed by an apparatus consisting of or utilizing the detector 215 connected to a processor arrangement (not illustrated), such as one or more microprocessors which may be contained within a computer or other device, which has been programmed (with a set of program instructions) in accordance with the present invention, with the resulting image displayed on a video display or otherwise recorded or stored. In addition, the set of program instructions may also be stored as computer-readable data or instructions on a computer-readable medium, such as a magnetic or optical disk, forming an embodiment of the invention as an article of manufacture.

Where optical properties of the deformation state lens are to be utilized to form the image in an uncompressed state 205, various compressive states of the sample may also be considered. For example, the natural state lens may be considered as optically neutral, or baseline, the shape of a cubic cell is equal on all sides or axes. For a deformation state lens, the volumetric shape of the cell may be more parabolic (and may be considered to be equal to a parabolic function of a force vector incident to the center of the cubic volumetric cell), resulting in a physical shape very similar to a concave lens, as shown in FIG. 2 as deformation state lens 200. The optical parameters to be utilized in back projecting to form the image in an uncompressed state 205 may be empirically determined based upon the sample type, degrees of compression, etc. As discussed with reference to FIG. 3, other historical or empirical parameters may also be utilized to create the image in an uncompressed state 205.

FIG. 3 is a diagram illustrating use of historical information of a deformation state lens for uncompressed state 300 image formation from a compressed state 340. As illustrated in FIG. 3, the sample being imaged is undergoing increasing degrees of compression, from fully uncompressed or relaxed state 300, to a first partially compressed state 310, to a second partially compressed state 320, to a third partially compressed state 330, to a fully compressed state 340. For each degree of compression of the sample, such as of the various states 300–340, empirical data concerning the sample will be measured, to create a historical database. Utilizing the empirical, historical information or database derived from such sequential deformation or compression, information collected from solely the fully compressed state 340 for a given sample or specimen may be utilized to create an image in an uncompressed state, such as uncompressed state 300. In addition, such historical information may also be combined with the ray trace information illustrated in FIG. 2, particularly for the formation of a three-dimensional uncompressed image.

For example, for imaging of human breast tissue, an empirical database may be developed based upon creation of a series of models of breast tissue, followed by creating a series of images of each breast tissue model as it undergoes the varying degrees of compression illustrated in FIG. 3. Continuing with this example, thirty to forty representative tissue models may be utilized. For each model, detected images are examined for areas of interest, and for a correlation of how these areas of interest change as the tissue undergoes compression and decompression. The resulting empirical model may then be used, for extrapolation or reverse projection, to create the maximally likely uncompressed image of subject tissue based upon the data derived while the subject tissue was compressed, such as creating an uncompressed image of breast tissue from an x-ray image taken during a mammogram. For particular areas of interest, such as microcalcifications, a Sobel operator may be useful, during the extrapolation or reverse projection process, to detect clusters of small objects and distinguish them from a single, large object.

In summary, FIGS. 1–3 disclose a method of creating an image of uncompressed matter (205, 300) from compressed matter (200, 340), the method comprising the steps of: (a) dividing the compressed matter into a plurality of volumetric cells 110; (b) collecting intensity data from the compressed matter, for each volumetric cell of the plurality of volumetric cells, to form volumetric cell data; and (c) utilizing a deformation state lens and the volumetric cell data, creating the image of uncompressed matter, preferably with steps (b) and (c) utilizing a detector 215 and a processor. Step (c) may also include extrapolating from the volumetric cell data utilizing optical properties of the deformation state lens, or extrapolating from the volumetric cell data utilizing historical properties of the deformation state lens. The method may also include detecting texture data from the image of uncompressed matter, and the texture data may represents microcalcifications in human breast tissue. Also in summary, the invention may also be embodied as an apparatus, comprising a detector and a processor arrangement (programmed as discussed above), or as an article of manufacture, such as a computer-readable medium containing a set of program instructions.

As may be apparent from the above discussion, the present invention provides significant advantages. For example, creation of an image of a specimen in an uncompressed state, from data collected or obtained of the specimen in a compressed state, may be especially valuable in certain fields, such as mammography and other radiological areas described above. The apparatus, method and article of manufacture of the present invention may be especially useful, as indicated above, in the reliable detection of microcalcifications of human breast tissue.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method of creating an image of uncompressed matter from compressed matter, the method comprising:

(a) dividing the compressed matter into a plurality of volumetric cells;

(b) collecting intensity data from the compressed matter, for each volumetric cell of the plurality of volumetric cells, to form volumetric cell data; and (c) utilizing a deformation state lens and the volumetric cell data, creating the image of uncompressed matter.

2. The method of claim 1, wherein the intensity data is collected as x-ray mammography data.

3. The method of claim 1, wherein the compressed matter is human breast tissue.

4. The method of claim 1, wherein the deformation state lens is parabolic.

5. The method of claim 1, wherein step (c) further comprises:

(c1) extrapolating from the volumetric cell data utilizing optical properties of the deformation state lens.

6. The method of claim 1, wherein step (c) further comprises:

(c2) extrapolating from the volumetric cell data utilizing historical properties of the deformation state lens.

7. The method of claim 1, further comprising:

(d) detecting texture data from the image of uncompressed matter.

8. The method of claim 7, wherein the texture data represents microcalcifications.

9. An apparatus for creating an image of uncompressed matter from compressed matter, the apparatus comprising:

a detector, the detector for collecting intensity data from the compressed matter; and a processor arrangement coupled to the detector, the processor arrangement responsive when operably coupled, through a set of program instructions, to divide the compressed matter into a plurality of volumetric cells, and for each volumetric cell of the plurality of volumetric cells, to form volumetric cell data from the intensity data, and the processor arrangement further responsive, utilizing a deformation state lens and the volumetric cell data, to create the image of uncompressed matter.

10. The apparatus of claim 9, wherein the intensity data is detected as x-ray mammography data.

11. The apparatus of claim 9, wherein the compressed matter is human breast tissue.

12. The apparatus of claim 9, wherein the deformation state lens is parabolic.

13. The apparatus of claim 9, wherein the processor arrangement is further responsive to extrapolate from the volumetric cell data utilizing optical properties of the deformation state lens.

14. The apparatus of claim 9, wherein the processor arrangement is further responsive to extrapolate from the volumetric cell data utilizing historical properties of the deformation state lens.

15. The apparatus of claim 9, wherein the processor arrangement is further responsive to detect texture data from the image of uncompressed matter.

16. The method of claim 15, wherein the texture data represents microcalcifications.

17. An article of manufacture for use in creating an image of uncompressed matter from compressed matter, the article of manufacture comprising:

a computer-readable storage medium; and computer-readable data stored on the computer-readable storage medium, the computer-readable data operative to direct steps of dividing the compressed matter into a plurality of volumetric cells; collecting intensity data from the compressed matter, for each volumetric cell of the plurality of volumetric cells, to form volumetric cell data; and utilizing a deformation state lens and the volumetric cell data, creating the image of uncompressed matter.

18. The article of manufacture of claim 17, wherein the deformation state lens is parabolic.

19. The article of manufacture of claim 17, wherein the computer-readable data is further operative to direct a step of extrapolating from the volumetric cell data utilizing optical properties of the deformation state lens.

20. The article of manufacture of claim 17, wherein the computer-readable data is further operative to direct a step of extrapolating from the volumetric cell data utilizing historical properties of the deformation state lens.

21. The article of manufacture of claim 17, wherein the computer-readable data is further operative to direct a step of detecting texture data from the image of uncompressed matter.

22. The article of manufacture of claim 21, wherein the texture data represents microcalcifications.

* * * * *